US012597026B2

(12) United States Patent
Gundavelli

(10) Patent No.: US 12,597,026 B2
(45) Date of Patent: Apr. 7, 2026

(54) VALIDATION AND STORAGE OF TRANSACTION DATA FOR A BLOCKCHAIN

(71) Applicant: PayPal, Inc., San Jose, CA (US)

(72) Inventor: Suryatej Gundavelli, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 39 days.

(21) Appl. No.: 18/596,060

(22) Filed: Mar. 5, 2024

(65) Prior Publication Data

US 2024/0320664 A1     Sep. 26, 2024

Related U.S. Application Data

(63) Continuation of application No. 16/711,708, filed on Dec. 12, 2019, now Pat. No. 11,941,619.

(51) Int. Cl.
*G06Q 20/00* (2012.01)
*G06Q 20/38* (2012.01)
(Continued)

(52) U.S. Cl.
CPC ..... *G06Q 20/3829* (2013.01); *G06Q 20/3827* (2013.01); *H04L 9/006* (2013.01);
(Continued)

(58) Field of Classification Search
CPC ........... G06Q 20/3829; G06Q 20/3827; G06Q 20/02; G06Q 20/0658; G06Q 20/38215; G06Q 20/401; G06Q 20/4097; G06Q 2220/00; H04L 9/006; H04L 9/0637; H04L 9/0643; H04L 9/3271; H04L 9/50; H04L 2209/56; H04L 9/3239; H04L 9/008
(Continued)

(56) References Cited

U.S. PATENT DOCUMENTS 10,055,591 B1     8/2018  Sharifi Mehr
10,929,402 B1     2/2021  Meng
(Continued)

FOREIGN PATENT DOCUMENTS

CA      2687020 A1      2/2014
EP      2197168 A1      8/2012
GB      2572567 A      10/2019

OTHER PUBLICATIONS

2018_Book_AdvancesInCryptologyCRYPTO2018 (Year: 2018), no copy provided.
(Continued)

*Primary Examiner* — Dante Ravetti

(74) *Attorney, Agent, or Firm* — Greenberg Traurig, LLP

(57)                     ABSTRACT

A system includes a memory and a processor configured to execute computer instructions stored in the memory that when executed cause the system to perform operations. The operations include receiving transaction data associated with a transaction via a transaction component. The operations include incorporating at least a portion of the transaction data into a security process associated with challenge-response authentication of a data block for the transaction data. The data block includes cryptographic hash data for another data block in a blockchain associated with the data block. The operations include validating the data block associated with the blockchain based on the security process.

20 Claims, 13 Drawing Sheets

(51) Int. Cl.
  *H04L 9/00*      (2022.01)
  *H04L 9/06*      (2006.01)
  *H04L 9/32*      (2006.01)

(52) U.S. Cl.
  CPC .......... *H04L 9/0637* (2013.01); *H04L 9/0643*
    (2013.01); *H04L 9/3271* (2013.01); *H04L 9/50*
    (2022.05); *H04L 2209/56* (2013.01)

(58) Field of Classification Search
  USPC .......................... 705/16, 21, 59; 380/44, 262
  See application file for complete search history.

(56) References Cited

U.S. PATENT DOCUMENTS

| | | | |
|---|---|---|---|
| 2010/0144314 A1 | 6/2010 | Sherkin | |
| 2015/0295716 A1 | 10/2015 | Liu | |
| 2018/0039667 A1 | 2/2018 | Pierce | |
| 2018/0351747 A1* | 12/2018 | Spangemacher | H04L 63/126 |
| 2019/0036678 A1 | 1/2019 | Ahmed | |
| 2019/0236527 A1* | 8/2019 | Bhaumik | G06Q 10/087 |
| 2019/0305968 A1 | 10/2019 | Versteeg | |
| 2019/0312719 A1 | 10/2019 | Cheon | |
| 2019/0342095 A1 | 11/2019 | Simons | |
| 2019/0394019 A1 | 12/2019 | Gao | |
| 2020/0052898 A1 | 2/2020 | Wentz | |
| 2020/0134578 A1 | 4/2020 | Shi | |
| 2020/0351253 A1 | 11/2020 | Treat | |
| 2020/0366459 A1 | 11/2020 | Nandakumar | |
| 2022/0012733 A1 | 1/2022 | Jain | |

OTHER PUBLICATIONS

CAPTCHA—Wikipedia (Year: 2022), 11 pp.
Challenge-response authentication—Wikipedia (Year: 2022), 4 pp.
CryptoBytes_January_2002_final (Year: 2002), 28 pp.
Hong, How Does Bitcoin Mining Work_ What Is Crypto Mining, Investopedia, (Year: 2020), 20 pp.
Massi et al., Proof-of-CAPTCHA: A True ASIC-Resistant Consensus (Year: 2019), International Journal of Advanced Research in Computer and Communication Engineering, vol. 8, Issue 8, 6 pp.
Lesavre et al., Blockchain Networks: Token Design and Management Overview, NIST.IR.8301 (Year: 2021), 84 pp.
Menezes et al., Handbook of Applied Cryptography (Year: 1997), 811 pp. *Provided by examiner in parent case.
Menezes et al., Handbook of Applied Cryptography (Year: 1996), 827 pp. *Provided by examiner in parent case.
Paillier cryptosystem—Wikipedia (Year: 2022), 5 pp.
Satoshi Nakamoto, Bitcoin: A Peer-to-Peer Electronic Cash System (Year: 2022), 9 pp.
Turing test—Wikipedia (Year: 2022), 27 pp.
What Is Proof of Stake (PoS}_ POS Types Examined_ Gemini (Year: 2022).
Yaga et al., Blockchain Technology Overview, NIST.IR.8202 (Year: 2018), 68 pp.

* cited by examiner

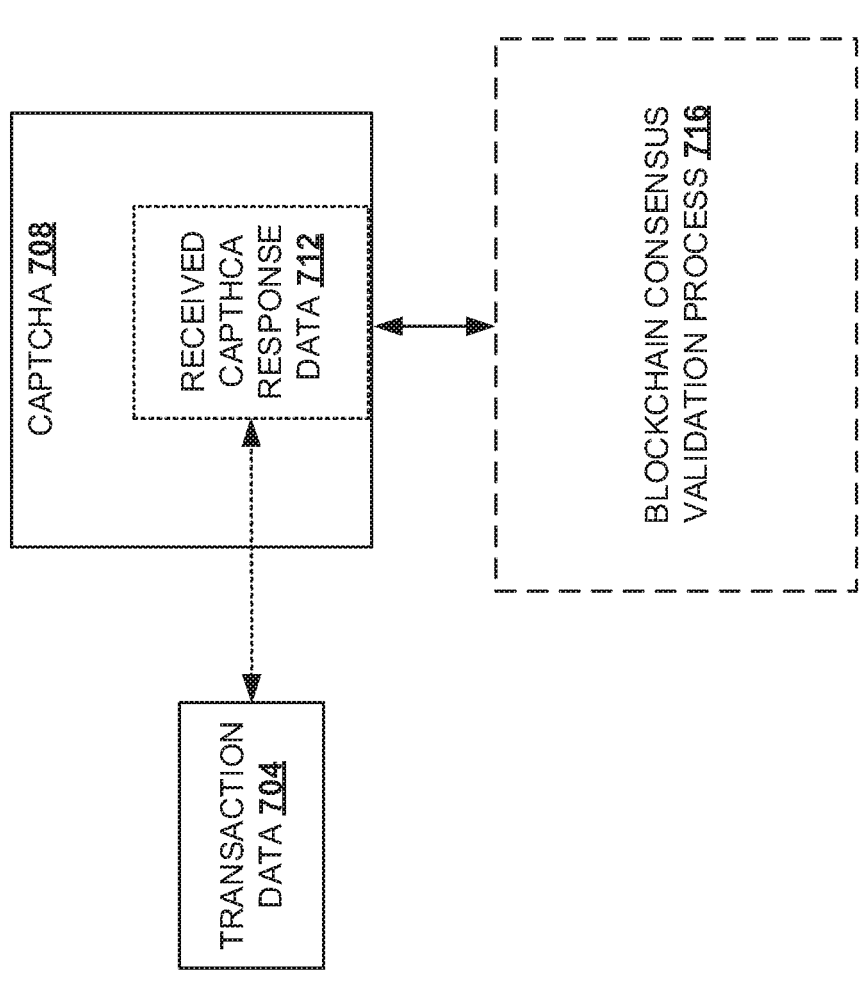
FIG. 7

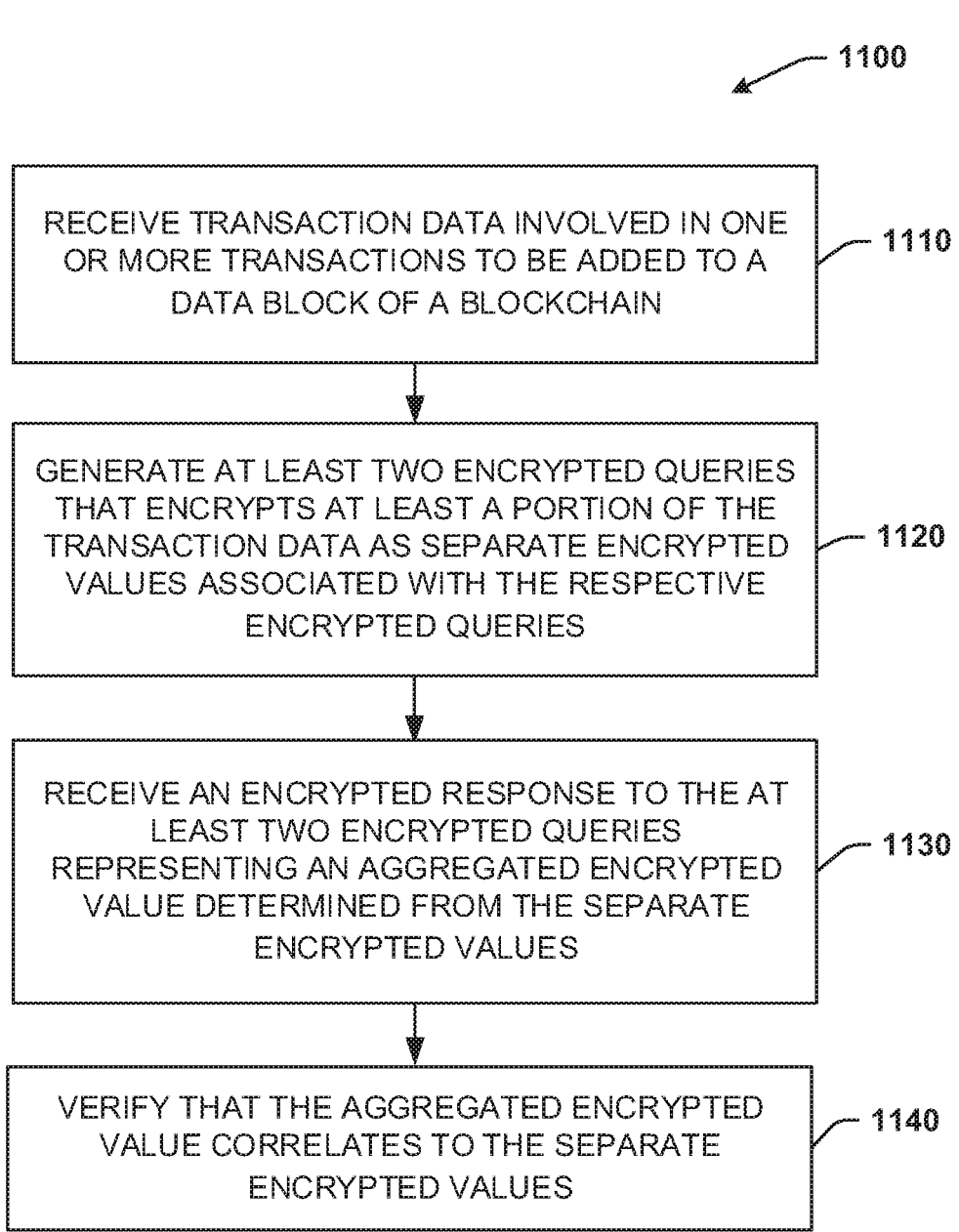

1100

RECEIVE TRANSACTION DATA INVOLVED IN ONE OR MORE TRANSACTIONS TO BE ADDED TO A DATA BLOCK OF A BLOCKCHAIN — 1110

GENERATE AT LEAST TWO ENCRYPTED QUERIES THAT ENCRYPTS AT LEAST A PORTION OF THE TRANSACTION DATA AS SEPARATE ENCRYPTED VALUES ASSOCIATED WITH THE RESPECTIVE ENCRYPTED QUERIES — 1120

RECEIVE AN ENCRYPTED RESPONSE TO THE AT LEAST TWO ENCRYPTED QUERIES REPRESENTING AN AGGREGATED ENCRYPTED VALUE DETERMINED FROM THE SEPARATE ENCRYPTED VALUES — 1130

VERIFY THAT THE AGGREGATED ENCRYPTED VALUE CORRELATES TO THE SEPARATE ENCRYPTED VALUES — 1140

FIG. 11

VALIDATION AND STORAGE OF TRANSACTION DATA FOR A BLOCKCHAIN

CROSS REFERENCE TO RELATED APPLICATION

This present invention is a Continuation of U.S. patent application Ser. No. 16/711,708, filed Dec. 12, 2019, which is incorporated herein by reference in its entirety.

TECHNICAL FIELD

This disclosure relates generally to transaction systems, and more specifically, to validation and storage of transaction data for a blockchain.

BACKGROUND

A blockchain is an implementation of a digital ledger. Similar to a database, a digital ledger can record information of various types, but unlike most databases, blockchain implementations employ cryptography to facilitate that recorded information is immutable and trusted. Data on the blockchain is immutable because it cannot be changed or removed, and it can thus be trusted because it is immutable. A given blockchain achieves this immutable quality by sharing instances of the ledger among different parties on a network and using a consensus model that employs multi-party agreement and verification each time an addition is made to the blockchain. Current consensus models however require large amounts of computing resources in order to establish trust in the blockchain. It would be desirable if more efficient systems methods were provided to determine consensus and/or store information on the blockchain.

BRIEF DESCRIPTION OF THE DRAWINGS

Numerous example aspects, implementations, objects and advantages described herein will be apparent upon consideration of the following detailed description, taken in conjunction with the accompanying drawings, in which like reference characters refer to like parts throughout.

FIG. 7 illustrates a block diagram of an example, non-limiting online transaction component that executes a Turing test to facilitate validating and storing transaction data in a blockchain in accordance with one or more examples described herein.

FIG. 11 illustrates a block diagram of an example, non-limiting method executed by a system and processor to facilitate storing transaction data in a blockchain in accordance with one or more examples described herein.

DETAILED DESCRIPTION

Figure 1:
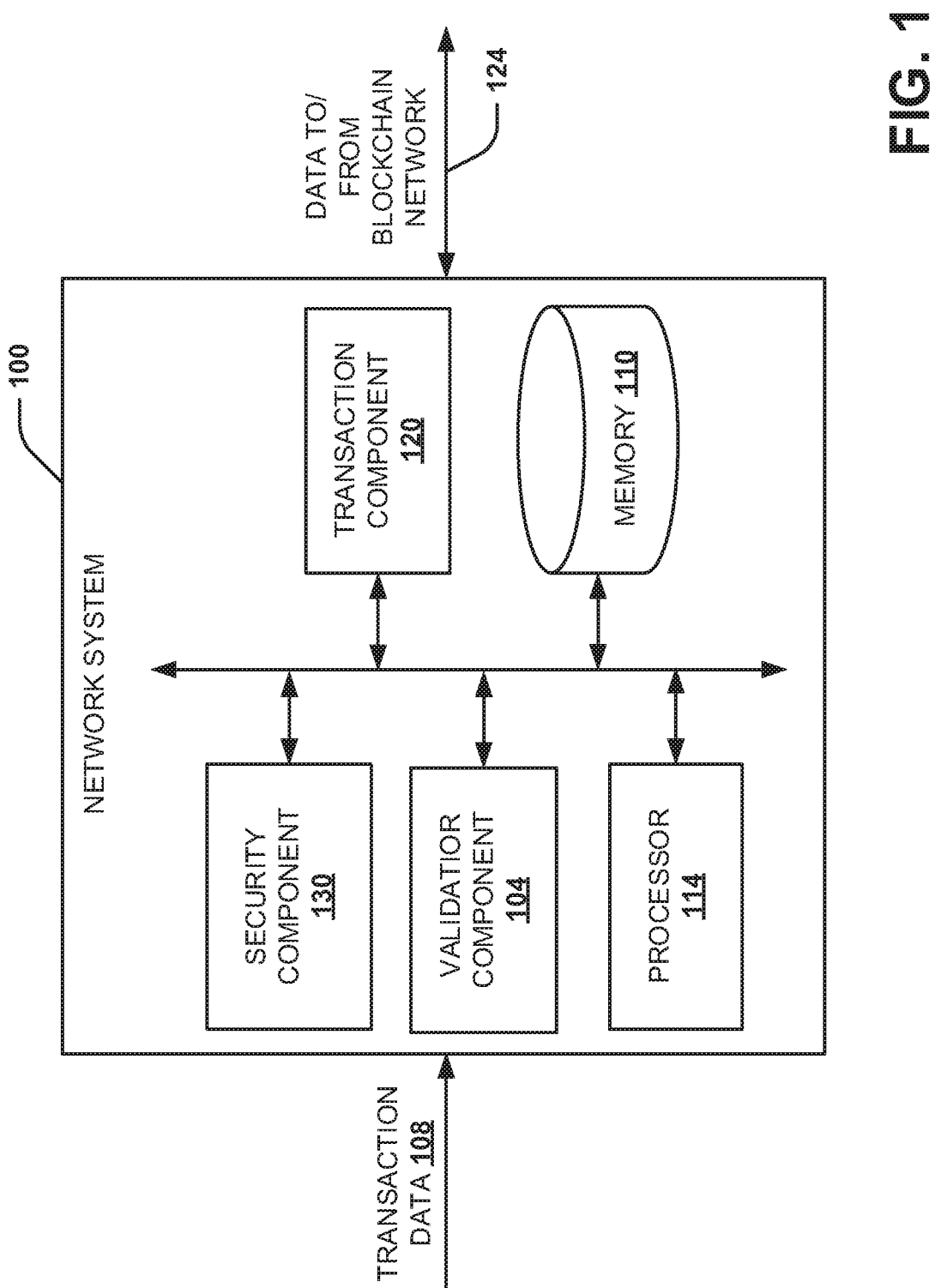
FIG. 1 illustrates a block diagram of an example, non-limiting network system that includes a validator component to facilitate storing transactions in a blockchain in accordance with one or more examples described herein.

Systems and methods are provided for validating and storing transaction data in a data block of a blockchain in a secure and efficient manner. One or more validator components operate with transaction components (e.g., transaction interface) to facilitate transactions between a transactor (or transactors) and another system (or systems). Records of the transactions can be stored in a blockchain where a portion of the transaction data is employed to achieve validation of the blockchain (e.g., consensus among multiple validators or validation by a single validator generating multiple queries). The portion of the transaction data can be formulated as encrypted queries related to the respective transaction(s) by query and security components operating with the validator components.

The encrypted queries can be exchanged over a network (e.g., private and/or public network), where blockchain responder components that may be entrusted with updating the blockchain, in an example, based on generating encrypted responses to the queries. Upon receiving the encrypted responses, the validator components verify (e.g., consensus verification) that the encrypted responses correlate to the encrypted queries. If such correlation is confirmed, the blockchain responder components can be notified by the validator components to update the blockchain with the transaction data which mitigates the need for processing of an entire data block (or blocks) as in current systems.

The transactions, for example, may be financial transactions between a transactor (e.g., user requesting a transaction) and a retailer, a user and a bank, a user attempting to load a file (e.g., music or literature), or some other type of transaction. The validator components and transaction components can be configured as a transaction system to facilitate such transactions between the transactors and the respective entities in which underlying transaction data is to be exchanged. The validator components may request different types of information in the form of a query from the transactors in order to authenticate and/or further validate a given transaction (e.g., validate an authenticated person is involved in the exchange versus a computer program acting as the person). In an example, the responses from the transactors can be encrypted and sent to blockchain responder components that supply encrypted responses to the respective queries. In another example, the validator components may generate the encrypted queries based on information exchanged in the transaction(s).

A public key can be exchanged with the blockchain responder components that enable generation of encrypted responses to the encrypted queries based on some item (or items) associated with the transaction that has been encrypted as part of the respective query. For example, a first validator component may encrypt a query as "Name the third item on the receipt in this transaction." A second validator component involved with a separate transaction may encrypt "Identify the total of this second transaction before taxes are computed." A blockchain responder component (or responders) may receive the encrypted queries and generate an encrypted response using the public key and identify answers to the respective queries. The response can be generated as part of a homomorphic encryption, for example, that is based on the sum or product of the encrypted queries.

Private keys can be shared between the validator components to verify that the responses from the blockchain responders using the public key correlate to the respective queries. If so, an acknowledgement can be sent to the blockchain responder component (or components) to proceed and update the blockchain with the underlying transaction data involved with the transaction from the respective validator components. In another example, a single validator component may generate multiple encrypted queries based on a given transaction or a series of transactions. In this example, a given blockchain responder component may formulate an encrypted response based on the multiple queries generated by the respective validator component.

Based on responding to the query (or queries) in a suitable manner, the validator component itself may update the blockchain or pass an acknowledgement to the blockchain responder component to update the blockchain. By encrypting portions of transactions and receiving encrypted responses, less overall processing is involved to both facilitate security and establish future trust in the blockchain. Thus, blockchain validation and/or consensus can be achieved in a secure and more efficient manner than current systems that require vast amounts of computing resources such as currently employed for cryptographic hash processing of entire data blocks. Moreover, trust can be achieved via the encrypted query/response protocols described herein that allows updating and/or adding new data blocks while mitigating vast arrays of computing resources and processing to establish trust in the blockchain.

In an example, a system includes a memory and a processor configured to execute computer instructions stored in the memory that when executed cause the system to perform operations. The operations include receiving transaction data associated with a transaction via a transaction component. The operations include incorporating at least a portion of the transaction data into a security process associated with challenge-response authentication of a data block for the transaction data. The data block includes cryptographic hash data for another data block in a blockchain associated with the data block. The operations include validating the data block associated with the blockchain based on the security process.

In another example, a computer-implemented method, includes receiving, by a system having a processor and a memory, transaction data involved in one or more transactions to be added to a data block of a blockchain. The method includes generating, by the system, at least two encrypted queries that encrypts at least a portion of the transaction data as separate encrypted values associated with the respective encrypted queries. The method includes receiving, by the system, an encrypted response to the at least two encrypted queries representing an aggregated encrypted value determined from the separate encrypted values. The method includes verifying, by the system, that the aggregated encrypted value correlates to the separate encrypted values.

In yet another example, a non-transitory machine-readable medium having machine-readable instructions that when executed by a processor cause the processor to receive transaction data involved in one or more transactions to be added to a data block of a blockchain. The instructions generate a plurality of encrypted queries that encrypts at least a portion of the transaction data as separate encrypted values associated with each of the plurality of encrypted queries. The instructions receive an encrypted response to the plurality of encrypted queries, wherein the encrypted response is based upon the separate encrypted values. The instructions verify that the encrypted response correlates to the separate encrypted values.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without one or more of these specific details in various examples, or with other methods, components, materials, and so forth. not explicitly mentioned herein. In other instances, well-known structures and devices are shown in block diagram form to facilitate describing one or more aspects disclosed herein.

FIG. 1 illustrates an example of a non-limiting network system 100 (also referred to as system 100) that includes a validator component 104 to facilitate storing transaction data 108 in a blockchain (not shown see e.g., FIG. 9) in accordance with one or more examples described herein. The system 100 includes a memory 110 and a processor 114 configured to execute computer instructions stored in the memory that when executed cause the system 100 to perform operations as described herein. The transaction data 108 is created by a transactor (see e.g., FIG. 2) that interacts with the transaction component 120 to facilitate a transaction. The transaction component 120 is operated by the validator component 104 to form a transaction system (see e.g., FIG. 2). The transaction component 120 can operate as an online transaction interface to facilitate receiving the transaction data 108 from the respective transactor.

As used herein, a transactor is a user who creates a given transaction to generate the transaction data 108 by interacting with the transaction component 120. The transaction data can include financial transactions, intellectual property transactions such as music or literature, barter transactions, auction transactions, and substantially any type of transaction where transaction data 108 is exchanged between the transaction component 120 and the transactor to facilitate the transaction. The validator component 120 as used herein, is operated as a third-party component to facilitate a given transaction between the transactor and some other party (e.g., a bank, a retailer, an auction service, a credit card company). The validator component 120 provides validation and authentication for a given transaction.

As used herein, the term validation refers to the process of the validator component 120 (or components) determining if blockchain responder components (see e.g., FIG. 2) are credentialed and have solved enough security responses to update a blockchain with the transaction data 108. As used herein, authentication is the process where a given transaction system operating the validator component 104 and transaction component 120 initially checks a user's credentials (e.g., via a transaction interface) and determines whether to proceed with a given transaction before the validation begins. Thus, authentication generally occurs before validation although such processes can occur concurrently. After suitable authentication and validation, the validator component(s) 104 can authorize blockchain responders (or take action themselves) to transfer data to the respective blockchain such as shown transferred at 124. Blockchain responder components and blockchains are illustrated and described below with respect to FIGS. 2, 4, 5, and 9.

The operations executed by the processor 114 (or processors) and stored as instructions in the memory 110 include receiving the transaction data 108 associated with a transaction via the transaction component 120. The operations include incorporating at least a portion of the transaction data 108 into a security process associated with challenge-response authentication of a data block for the transaction data 108. The security process as described herein can be executed by a security component 130 that provides encryption of queries, among other security functions, involved in the authentication and validation of the transaction data 108 before it can be stored in the blockchain. Such authentication and validation are described below with respect to FIGS. 2-11. The data block as described herein includes cryptographic hash data for another data block in a blockchain (see e.g., FIGS. 2 and 9) associated with the data block. The operations include validating the data block associated with the blockchain based on the security process executed by the security component 130.

Rather than current systems that utilize vast amounts of computing resources to solve cryptographic hash algorithms that operate over the entire history of the blockchain, the network system 100 encrypts portions of the transaction data 108 as part of a query, where one or more blockchain responder components respond to the query in an encrypted manner to allow the validator component 104 to determine if the transaction data 108 can be added to the respective blockchain. In this manner, a portion of the transaction data 108 is used to determine trust in the blockchain and thus much fewer computing resources and processing is involved to both establish the trust and to facilitate immutability in the blockchain. Thus, stored data in the blockchain cannot be changed and is immutable without entities (such as system 100) being aware of such changes since such entities are responsible for the security mechanisms that enabled respective updates to the blockchain.

Figure 2:
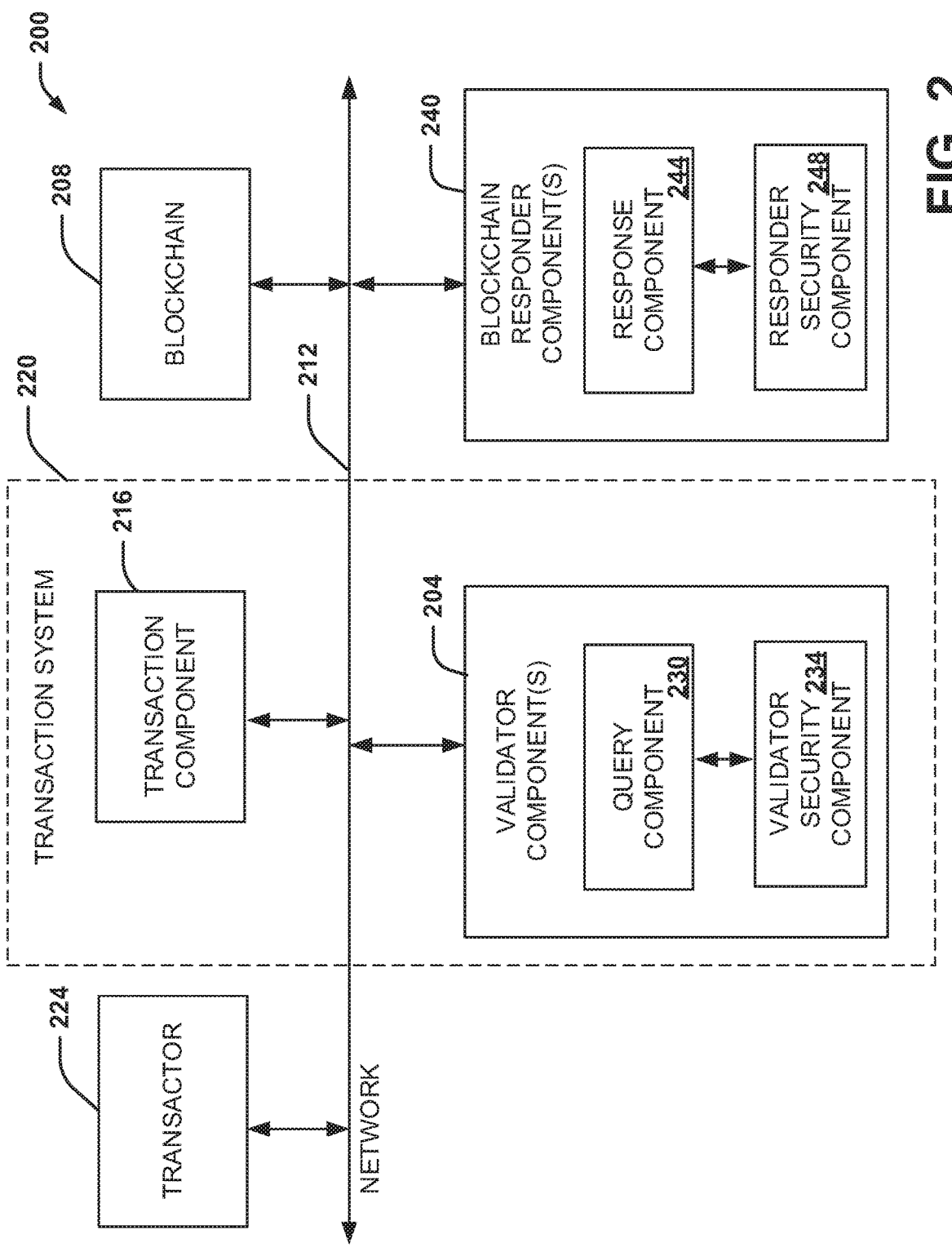
FIG. 2 illustrates a block diagram of an example, non-limiting network system that includes at least one validator component to generate encrypted queries to facilitate validating and storing transaction data in a blockchain in accordance with one or more examples described herein.

FIG. 2 illustrates an example of a non-limiting network system 200 that includes at least one validator component 204 to generate encrypted queries to facilitate validating and storing transaction data in a blockchain 208 in accordance with one or more examples described herein. The blockchain 208 can be configured as a series of data blocks where new data blocks are added to the blockchain based on the security protocols described herein. The blockchain 208 can be accessed over a public and/or private network 212 (e.g., Internet, Intranet, business network) and managed by one or more entities entrusted to update the blockchain. The validator component 204 (or components) operates with a transaction component 216 and forms a transaction system 220 to facilitate receiving transaction data from a transactor 224 operating over the network 212. In an example, the transaction system 220 can manage and/or process transactions associated with electronic accounts of users (e.g., facilitate payment between transactor and a third party, transfer files between parties, initiate secure activities between parties, and so forth).

The validator component 204 includes a query component 230 to generate a query that is encrypted by a validator security component 234. The query contains and encrypts some portion of the underlying transaction with the transactor 224. The portion of transaction data can include a portion of the transaction itself (e.g., what is the second item in the transaction, how much is the third item in the transaction), timestamp information regarding the timing of the transaction, contextual information regarding some aspect of the transaction such as what building is nearby, what street is the transaction taking place, what is the current temperature, and so forth. Another type of security protocol that may be employed by the transaction system 220 is a Turing test such as for example, a Completely Automated Public Turing test to tell Computers and Humans Apart (Captcha) that is a type of challenge-response test used in computing to determine whether the transactor 224 is human.

Based on the encrypted queries generated by the validator component 204 and query component 230, one or more blockchain responders 240 may answer the respective encrypted queries via a response component 244 that employs a responder security component 248 to generate an encrypted answer to the portion of the transaction that is formulated in the encrypted query by the validator component 204. As used herein, the term blockchain responder refers to an entity entrusted to update the blockchain 208 based on suitably answering the respective queries from the validator component 204. In one example, multiple validator components 204 may generate a query (or queries) related to separate transactions, where the blockchain responder components 240 answer each of the queries is a combined response and the respective validator components verify that their query was answered successfully by the blockchain responder.

Upon suitable verification, the validator components 204 can notify the blockchain responder 240 to update the blockchain 208 with the transaction data associated with respective transactions with their associated transactors 224. In another example, a single validator component 204 may generate multiple queries relating to single and/or multiple transactions and verify that a given blockchain responder 204 has answered the respective query (or queries) suitably before notifying the responder to update the blockchain 208 with the transaction data. In yet other examples, upon verification, the validator component 204 may update the blockchain 208 with the transaction data and thus bypass the update by the blockchain responder component 240. The blockchain responder component 240 can be any entity having authority to update the blockchain 208 upon successfully completing the security exchanges (e.g., providing encrypted responses to the encrypted queries) described herein. In a crypto-currency example, the blockchain responder component 240 could be a "miner" that answers the encrypted queries, however, the systems and methods described herein are not limited to blockchain mining examples employed as the blockchain responders 240.

Figure 3:
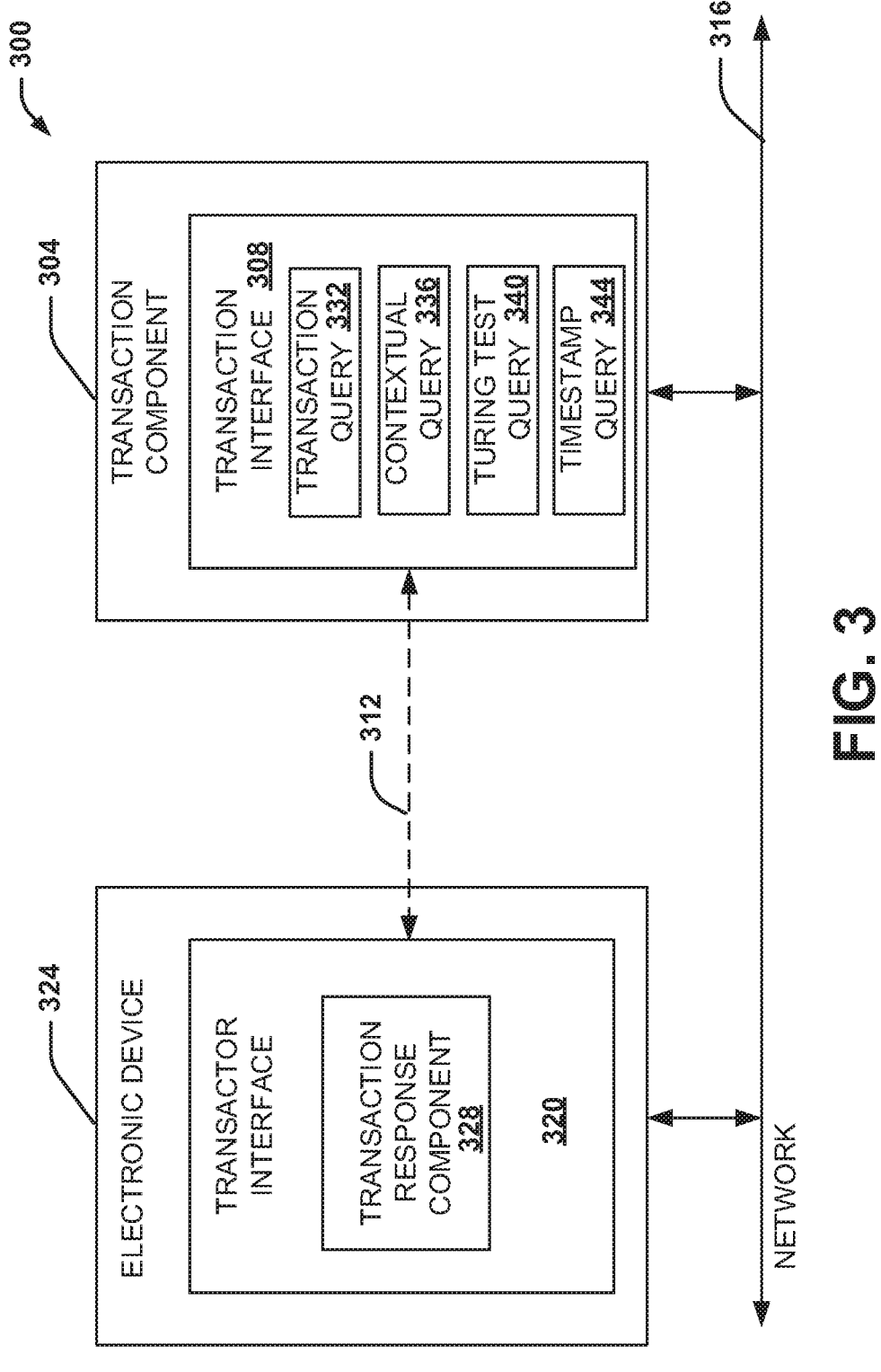
FIG. 3 illustrates a block diagram of an example, non-limiting network system that includes a transaction component operated by at least one validator component to generate encrypted queries to facilitate validating and storing transaction data in a blockchain in accordance with one or more examples described herein.

FIG. 3 illustrates an example, non-limiting network system 300 that includes a transaction component 304 operated by at least one validator component (not shown) to generate encrypted queries to facilitate validating and storing transaction data in a blockchain in accordance with one or more examples described herein. The transaction component 304 includes a transaction interface 308 that operates via a network connection 312 across network 316. The network connection 312 connects to a transactor interface 320 operated on an electronic device 324 that can include a computer, cell phone, workstation, personal digital assistant, or substantially any device capable of operating the transactor interface. A transaction response component 328 is provided to enable answering authentication and/or security questions regarding the underlying transaction that is issued from the transaction component 304 and as provided by the transaction interface 308. As shown, the transaction interface 308 can issue various types of queries to the transactor interface 320 in which the transactor provides a response thereto via the transaction response component 328.

In one example, a transaction query 332 can be formulated, where the query contains and encrypts some portion of the underlying transaction with the transactor. The portion of transaction data can include a portion of the transaction itself such as what is the fourth item in the transaction (e.g., book, card, device), how much is the third item in the transaction, what is the amount of the transaction before tax, and so forth. In another example, a contextual query 336 can be formulated and issued (e.g., by the transaction system) via the transaction interface 308, where contextual information can be queried from the transactor regarding some aspect of the transaction such as what building is nearby, what street is the transaction taking place, what is the name or color of the sign nearby, and so forth.

In yet another example, a Turing test query 340 can be initiated by the transaction interface 308. This can include a Completely Automated Public Turing test to tell Computers and Humans Apart (Captcha) that is a type of challenge-response test used in computing to determine whether the transactor is human. In still yet another example, a time-stamp query 344 can be initiated by the transaction interface 308, where some aspect of time is queried with the transactor such as approximately when did you logon to the transaction system, when was the last item in the transaction selected or listed, approximately how many hours is it until the sun sets, and so forth. In some examples, the transactor answers to the queries can be encrypted as queries which are then forwarded to the blockchain responders. In other examples, the validator components having knowledge of the underlying transactions, and thus may formulate the queries without involving the transactor responses in the queries issued to the blockchain responders. In other examples, both transactor responses and validator query formulations may be encrypted and supplied to the respective blockchain responders which are subsequently answered in encrypted form before updating the blockchain with the transaction data gathered from the electronic device 324.

The transactor interface 320 can be tasked with rendering at least a portion of the security process (e.g., encrypted query) described herein via a display of the electronic device 324. The rendering can include at least one of rendering visual data associated with the security process via the display and rendering contextual data associated with the transaction via the display. Rendering the visual data can include at least one of presenting the visual data associated with a query regarding information contained in the portion of the transaction data and generating a query regarding contextual information for the transaction. As mentioned previously, rendering the visual data can include at least one of presenting the visual data based on a timestamp associated with the transaction and rendering the visual data by executing an automated Turing test associated with the challenge-response authentication of the system.

Figure 4:
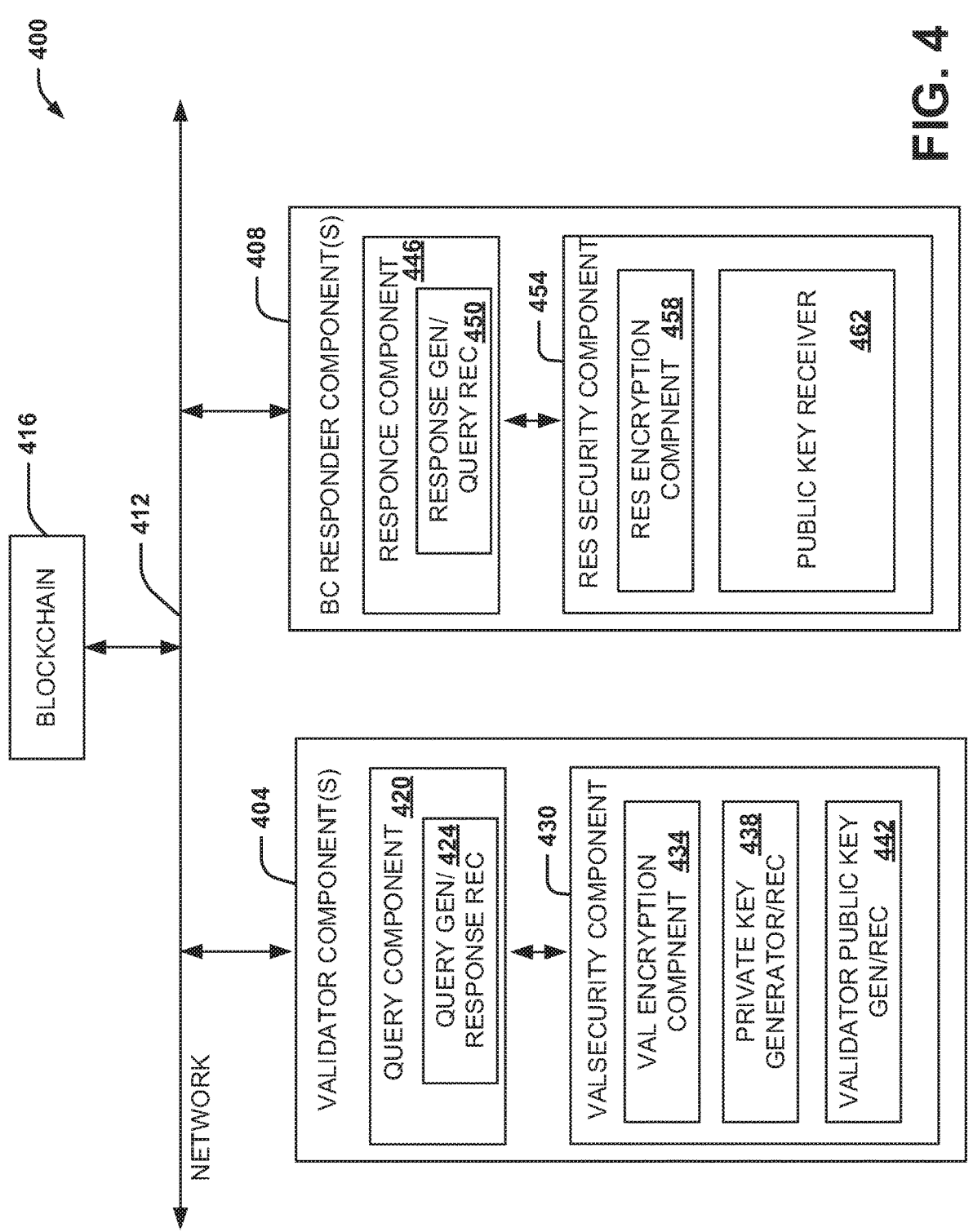
FIG. 4 illustrates a block diagram of an example, non-limiting network system that includes at least one validator component and blockchain responder component to generate encrypted queries and encrypted responses that facilitate validating and storing transaction data in a blockchain in accordance with one or more examples described herein.

FIG. 4 illustrates an example of a non-limiting network system 400 that includes at least one validator component 404 and blockchain responder component 408 to generate encrypted queries and encrypted responses that facilitate validating and storing transactions in a blockchain in accordance with one or more examples described herein. As shown, the validator component 404 communicates over a network 412 to the blockchain responder components to facilitate storing transaction data into a blockchain 416. The validator component 404 includes a query component 420 that in turn includes a query generator/response receiver 424 to both send encrypted queries and receive/process encrypted responses from the blockchain responder components 408. A validator security component 430 includes a validator encryption component 434 to encrypt queries as described herein. A private key generator/receiver 438 is employed to send/receive private encryption keys to other validators to verify blockchain responses to the respective encrypted queries sent from each of the validators to the blockchain responder components 408. A validator public key generator is sent over the network 412 to the blockchain responders and utilized to answer the encrypted queries from the validator components 404.

The blockchain responder components 408 include a response component 446 that includes a response generator/receiver 450 to both receive encrypted queries from the validator components 404 and to transmit encrypted answers to the respective queries. A responder security component 454 includes a response encryption component 458 to generate encrypted answers to the queries and a public key receiver 462 to retrieve public keys from the validator components 404 and are used to interpret/answer the encrypted queries sent from the respective validators.

As mentioned previously, a transaction component (not shown) can be operated by the validator component 404, where the validator component facilitates operations that include at least one of generating at least one transactor query regarding the transaction to a transactor via the display of an electronic device. This also includes generating at least one blockchain query regarding the transaction to a blockchain responder component 408 having authority to update the blockchain 416. The transaction component includes presenting a transaction interface to the transactor to facilitate performing at least one of a financial exchange between parties, a file exchange between parties, and a property exchange between parties, wherein the data block in the blockchain 416 is employed to record the exchanges.

A private key can be employed by the validator component 404 as part of the security process described herein to encrypt the at least one transactor query and the at least one blockchain query. A public key can be exchanged between the validator component 404 and the blockchain responder component 408 as part of the security process, wherein the public key is employed by the blockchain responder component to send an encrypted response in response to the encrypted blockchain query. The private key can be employed by the validator component 404 as part of the security process for verifying the encrypted response to the encrypted blockchain query.

The blockchain responder component 408 and/or validator component 404 update the data block in the blockchain 416 with the transaction data based on verifying the encrypted response. The security process as described herein can include a homomorphic encryption (e.g., via Paillier cryptographic model), where the encrypted queries are generated as $E(Q_1), E(Q_2) \ldots E(Q_N)$ by the at least one validator component 404. The blockchain responder component 408 responds with the encrypted response to the respective queries and can be represented as an aggregated encrypted value such as a summation (or product) represented as $E(Q_1+Q_2 \ldots +Q_N)$ or $E(Q_1*Q_2 \ldots *Q_N)$, with E representing an encryption using a private or public key, Q representing a query, and N representing a positive integer. In one example, the encrypted queries and the encrypted response is generated as a hash value.

Figure 5:
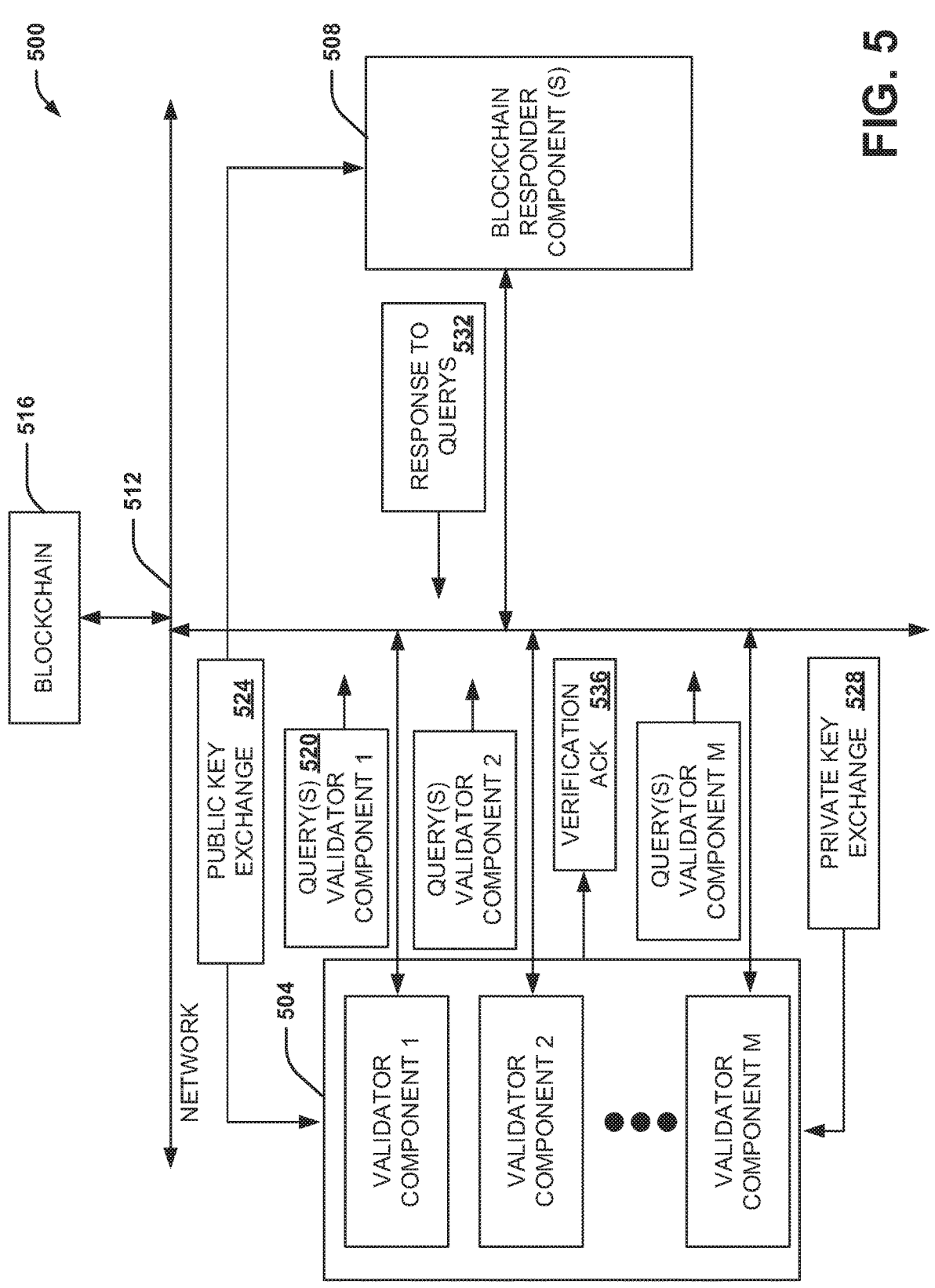
FIG. 5 illustrates a block diagram of an example, non-limiting network system that includes at least one validator component and blockchain responder component to facilitate encrypted key exchanges, generate encrypted queries and encrypted responses that facilitate validating and storing transaction data in a blockchain in accordance with one or more examples described herein.

FIG. 5 illustrates an example of a non-limiting network system 500 that includes validator components and at least one blockchain responder component to facilitate encrypted key exchanges, generate encrypted queries and encrypted responses that facilitate validating and storing transactions across a network 512 to a blockchain 516 in accordance with one or more examples described herein. The following process example is provided to illustrate a security process via example exchanges 1 through 7 below in which the blockchain 516 can be updated:

Exchange 1: Transactor 1 (not shown) operating with validator component 1 creates a transaction and answers Query Q(1) at 520 (e.g., user creates a financial transaction using a financial payment provider).

Exchange 2: A public key at 524 can be shared with the rest of the chain (validator components 504 and blockchain responders 508).

Exchange 3: Validator 1 creates a query Q(1) with an answer to the query then encrypts it with a selected private key 528 agreed upon among validators and designates the answer as Encrypted Answer E(1).

Exchange 4: Process continues for a set of other transactions for instance two other validators 2 and validator M (M being a positive integer) can create their own queries Q(2), Q(M), respectively, where each validator holds onto their respective encrypted answers E(2) and E(M).

Exchange 5: The blockchain responder component 508 responds at 532 with an answer to Q(1), Q(2), and Q(M) and then will add them together to generate (A1)+(A2)+(AM) and then send encrypted sum E(A1+ A2+AM) (or product) to the set of validator components 504.

Exchange 6: The validators 1 through M share E(1), E(2), and E(M) amongst each other to generate E(A1+A2+ AM) and verify by encrypting the (A1+A2+AM) generated by the blockchain responder 508 to verify that the two values correlate. Based on a homomorphic encryption protocol, for example, E(A1)+E(A2)+E (AM)=E(A1+A2+AM).

Exchange 7: Blockchain responder component 508 updates blockchain 516 upon successfully answering the questions and receiving a verification acknowledgement at 536. In another example, validator components 504 can update the blockchain 516 upon receiving suitable answers in the response 532.

Figure 6:
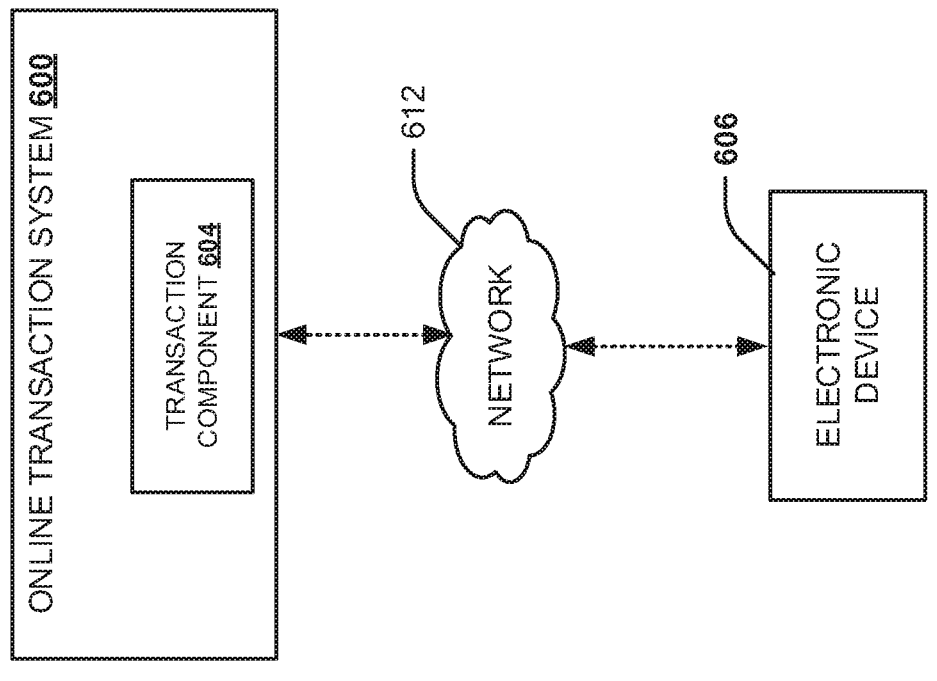
FIG. 6 illustrates a block diagram of an example, non-limiting online transaction system that includes a transaction component operating with an electronic device to facilitate validating and storing transaction data in a blockchain in accordance with one or more examples described herein.

FIG. 6 illustrates an example of a non-limiting online transaction system 600 that includes a transaction component 604 operating with an electronic device 606 across a network 612 to facilitate validating and storing transactions in a blockchain in accordance with one or more examples described herein. In this example, a remote interface may be operated by the transaction component 608 across the network 612 in accordance with the electronic device 606. For instance, the electronic device 606 could be a computer operating the remote interface where security credentials are checked and responses to queries as described herein can be provided. The remote interface can be provided as part of a graphical user interface, for example that supplies various fields to exchange user information, transaction details, and information to supply Captcha exchanges and/or other type query exchanges as described herein.

FIG. 7 illustrates an example of a non-limiting online transaction system 700 that executes a Turing test to facilitate validating and storing transaction data in a blockchain in accordance with one or more examples described herein. In this example, transaction data 704 is exchanged as part of a Turing test with a Captcha component 708 and stored as received Captcha response data 712. For example, the response data 712 may include a response by a transactor confirming they are a user of the system as opposed to a computer program disguised as a user. The Captcha response data 712 can be formulated into a query such as described with respect to FIG. 6, where a block chain consensus can be achieved at 716 by each of the respective validators confirming that their respective encrypted answers were received and suitably answered by the blockchain responders.

Figure 8:
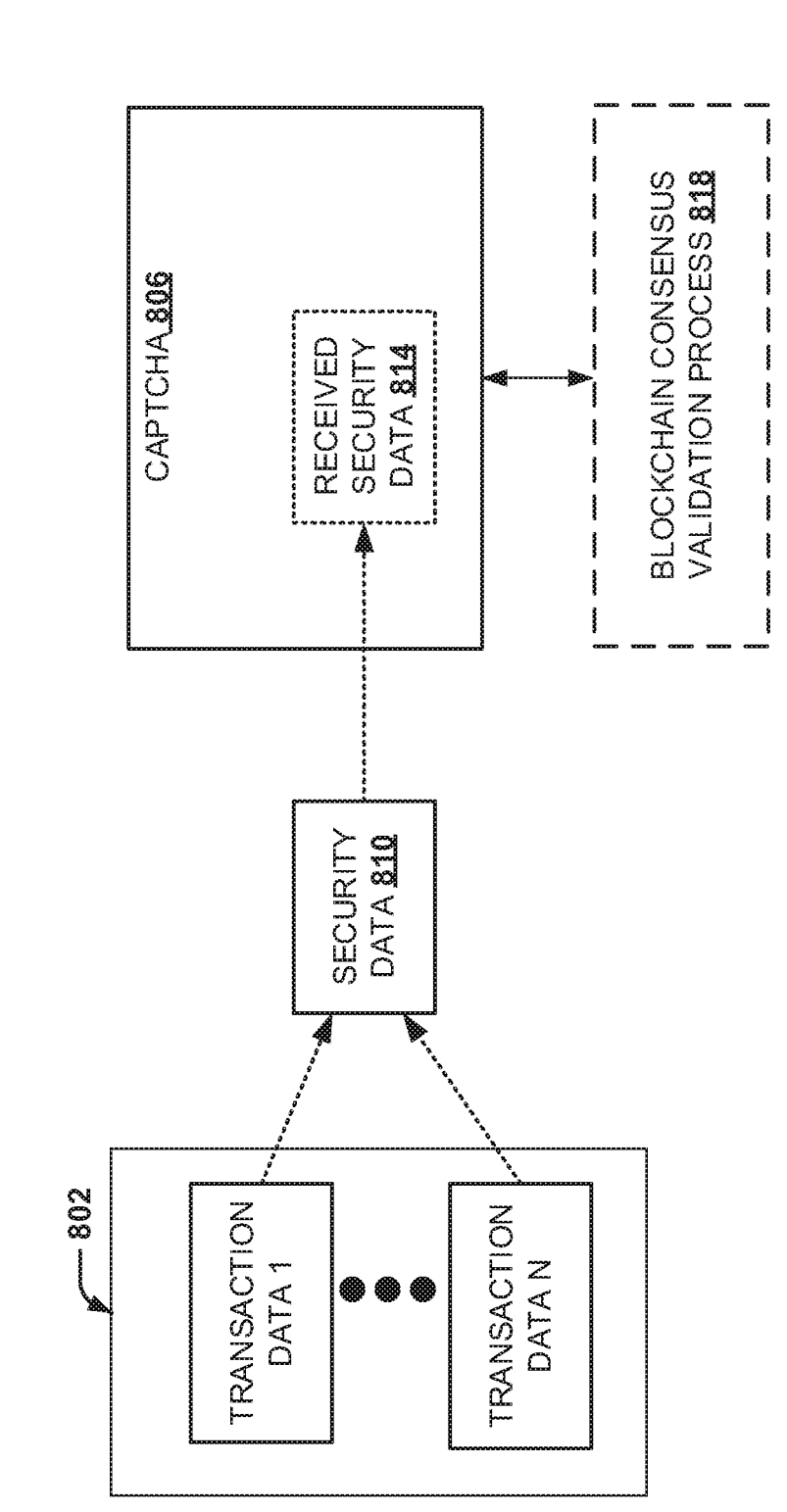
FIG. 8 illustrates a block diagram of an example, non-limiting online transaction component that executes a Turing test for multiple transactions to facilitate validating and storing transaction data in a blockchain in accordance with one or more examples described herein.

FIG. 8 illustrates an example of a non-limiting online transaction system that executes a Turing test for multiple transactions to facilitate validating and storing transaction data in a blockchain in accordance with one or more examples described herein. In this example, transaction data 802 is collected from multiple transactors that are interacting with one or more Captcha components 806 to facilitate security with a given transaction. The transaction data 802 is aggregated as security data 810 and stored as received security data 814. A block chain consensus can be achieved at 818 by each of the respective validators confirming that their respective encrypted answers based on the transaction data 802 were received and suitably answered by the blockchain responders such as described with respect to FIG. 6.

Figure 9:
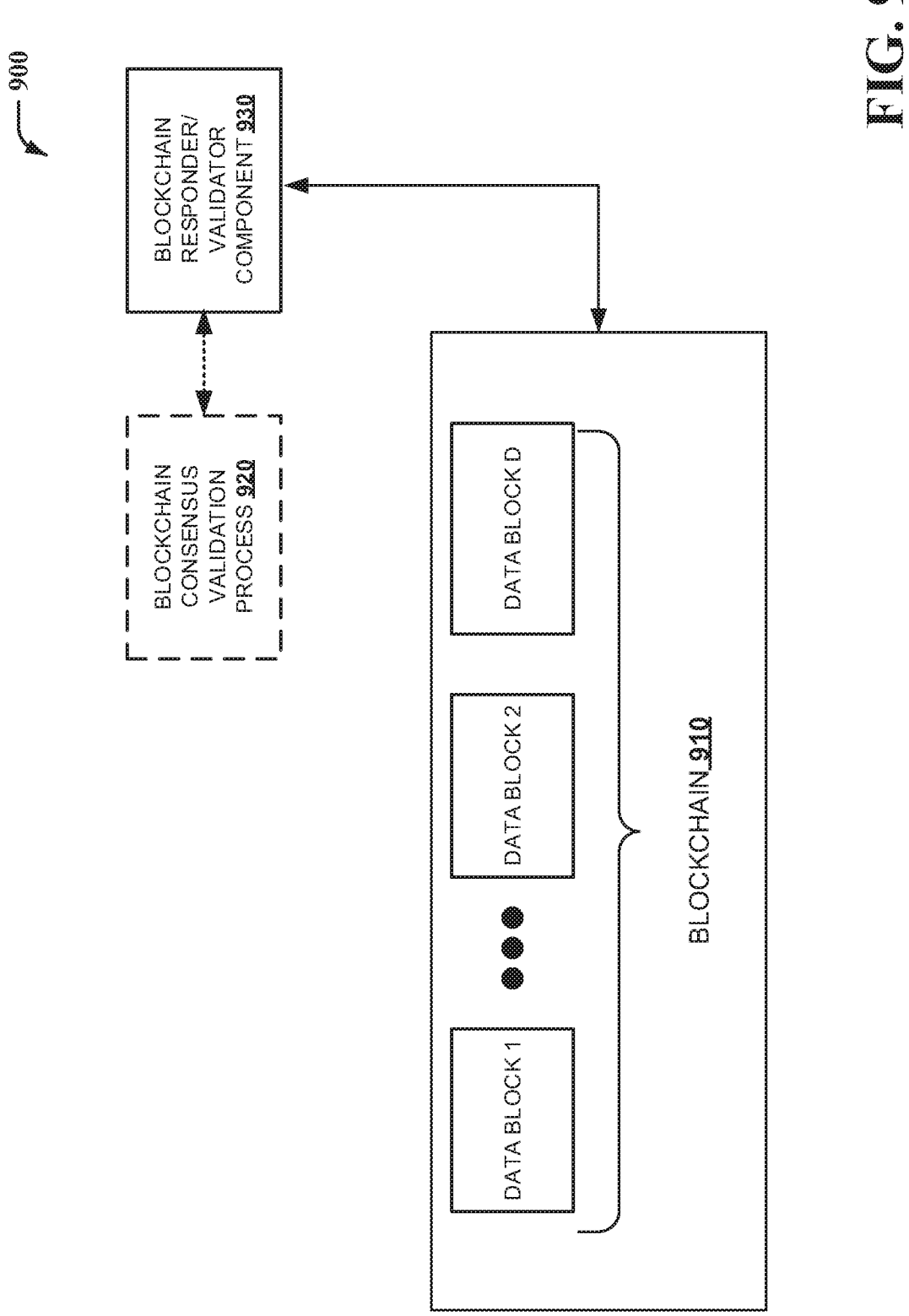
FIG. 9 illustrates a block diagram of an example, non-limiting network system operating with a blockchain to facilitate consensus validation and storage of transaction data in the blockchain in accordance with one or more examples described herein.

FIG. 9 illustrates an example of a non-limiting network system 900 operating with a blockchain 910 to facilitate consensus validation and storage of transactions in the blockchain in accordance with one or more examples described herein. As shown, the blockchain 910 includes data blocks 1 through D, with D being a positive integer. A consensus validation process 920 is executed according to the validation and security processes described with respect to FIGS. 6, 7, and 8 to update the blockchain. The consensus validation process 920 operates in accordance with blockchain responder/validator components at 930 to execute the security processes described herein in order to update the blockchain 910.

Figure 10:
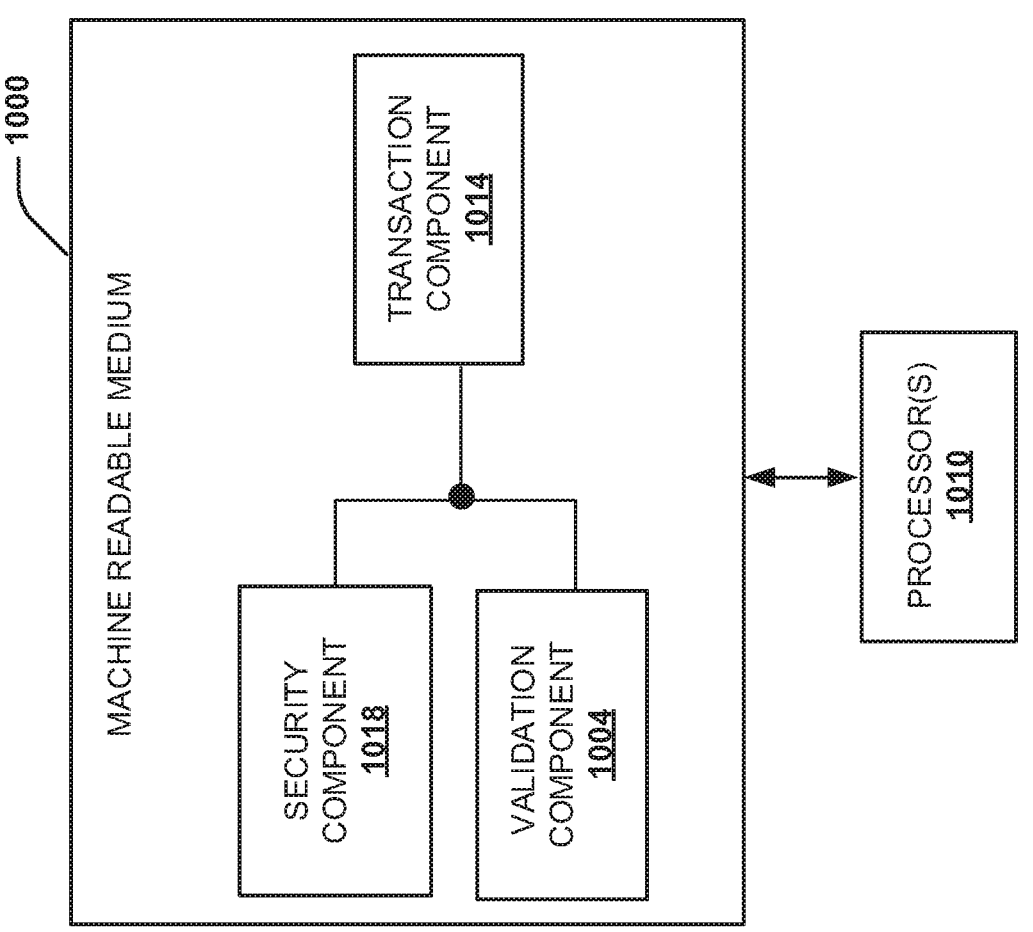
FIG. 10 illustrates a block diagram of an example, non-limiting machine-readable medium that includes a validator component to facilitate storing transaction data in a blockchain in accordance with one or more examples described herein.

FIG. 10 illustrates an example of a non-limiting machine-readable medium 1000 that includes a validator component 1004 to facilitate storing transaction data in a blockchain (not shown) in accordance with one or more examples described herein. The machine-readable medium 1000 includes machine-readable instructions that when executed by a processor 1010 cause the processor to receive transaction data involved in one or more transactions to be added to a data block of a blockchain. The transaction data can be received by a transaction component 1014. The instructions the validation component 1004 and a security component 1018 that generate a plurality of encrypted queries that encrypts at least a portion of the transaction data as separate encrypted values associated with each of the plurality of encrypted queries.

The instructions, executed by the validator component 1004, receive an encrypted response to the plurality of encrypted queries, wherein the encrypted response is based upon the separate encrypted values. The instructions, executed by the validator component 1004, verify that the encrypted response correlates to the separate encrypted values. The instructions also can include causing the processor 1010 to update the data block in the blockchain with the transaction data based on verifying that the encrypted response (e.g., by the validator component 1004) correlates to the separate encrypted values.

FIG. 11 illustrates a computer-implemented methodology and/or a flow diagram in accordance with the disclosed subject matter. For simplicity of explanation, the methodology 1100 is depicted and described as a series of acts. It is to be understood and appreciated that the subject method is not limited by the acts illustrated and/or by the order of acts, for example acts can occur in various orders and/or concurrently, and with other acts not presented and described herein. Furthermore, not all illustrated acts may be employed to implement the methodology in accordance with the disclosed subject matter. In addition, those skilled in the art will understand and appreciate that the methodology could alternatively be represented as a series of interrelated states via a state diagram or events. Additionally, it should be further appreciated that the methodology disclosed hereinafter and throughout this specification are capable of being stored on an article of manufacture to facilitate transporting and transferring such methodologies to computers. The term article of manufacture, as used herein, is intended to encompass a computer program accessible from any computer/machine-readable device and/or storage media.

FIG. 11 illustrates an example of a non-limiting method 1100 executed by a system and processor to facilitate validating and storing transaction data in a blockchain in accordance with one or more examples described herein. At 1110, the method 1100 includes receiving, by a system having a processor and a memory, transaction data involved in one or more transactions to be added to a data block of a blockchain (e.g., via a transaction system 216). At 1120, the method 1100 includes generating, by the system, at least two encrypted queries that encrypts at least a portion of the transaction data as separate encrypted values associated with the respective encrypted queries (e.g., via query component 230 and validator security component 234). At 1130, the method 1100 includes receiving, by the system, an encrypted response to the at least two encrypted queries representing an aggregated encrypted value (e.g., at least one of an encrypted summation or an encrypted product) determined from the separate encrypted values (e.g., received via validator component 204). At 1140, the method 1100 includes verifying, by the system, that the aggregated encrypted value correlates to the separate encrypted values (e.g., via the validator component 204).

Although not shown, the method 1100 can also include updating, by the system, the data block in the blockchain with the transaction data based on verifying that the aggregated encrypted value correlates to the separate encrypted values. The method 1100 can include employing, by the system, a private key to encrypt the at least two encrypted queries, and utilizing, by the system, a public key to generate the encrypted response to the at least two encrypted queries. The method 1110 can include utilizing the private key for verifying, by the system, that the aggregated encrypted value correlates to the separate encrypted values. In an example, the at least two encrypted queries are generated as a homomorphic encryption, wherein the encrypted queries are generated as $E(Q_1)$, $E(Q_2)$ ... $E(Q_N)$ and the encrypted response to the respective queries can be an aggregated encrypted value such as a summation represented as $E(Q_1+Q_2+\ldots Q_N)$ or a product $E(Q_1{*}Q_2 \ldots {*}Q_N)$, with E representing an encryption using a private or public key, Q representing a query, and N representing a positive integer. In another example, the at least two encrypted queries and the encrypted response is generated as a hash value.

Figure 12:
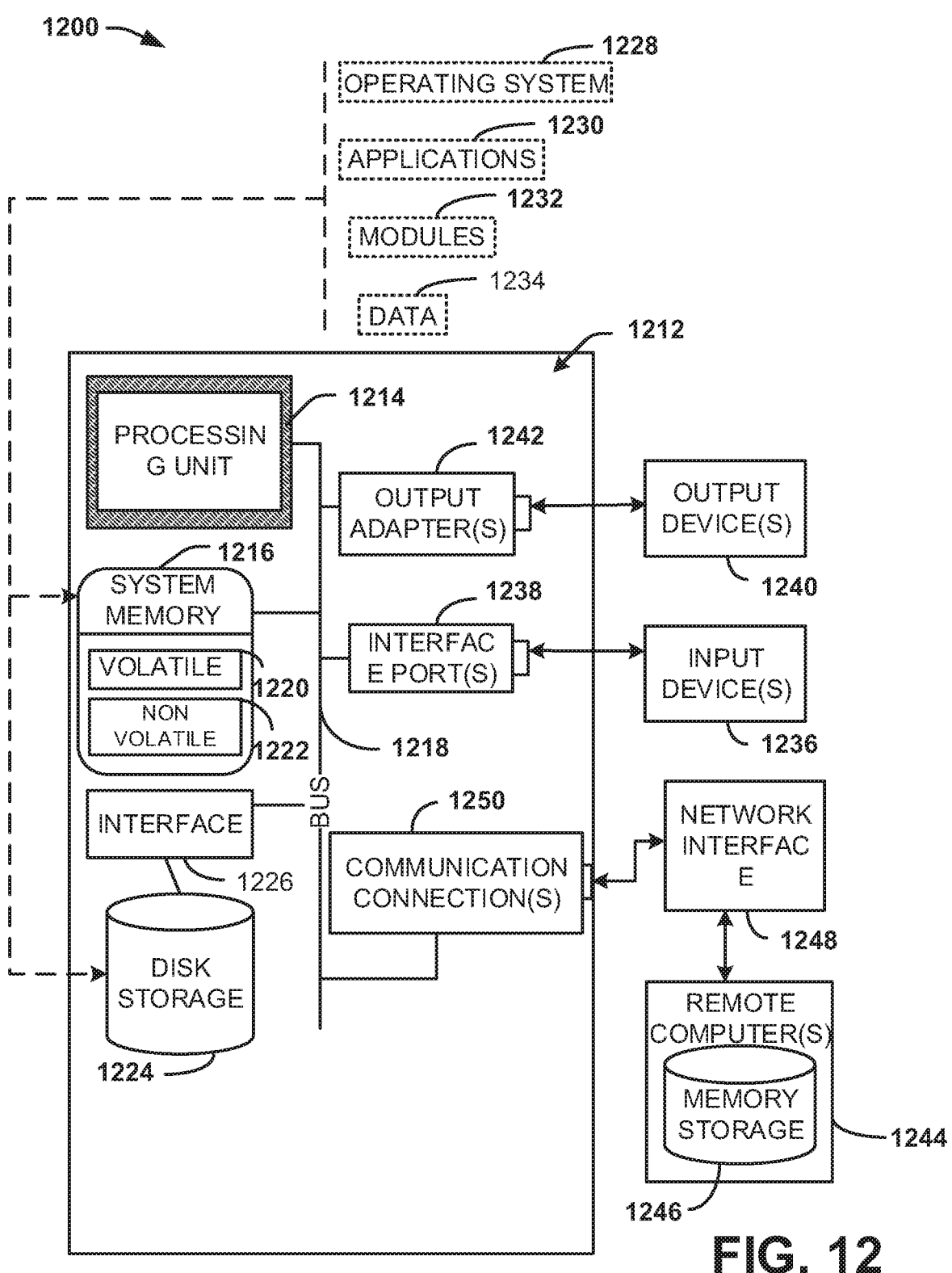
FIG. 12 is a schematic block diagram illustrating a suitable operating environment example to facilitate storing transaction data in a blockchain in accordance with one or more examples described herein.
Figure 13:
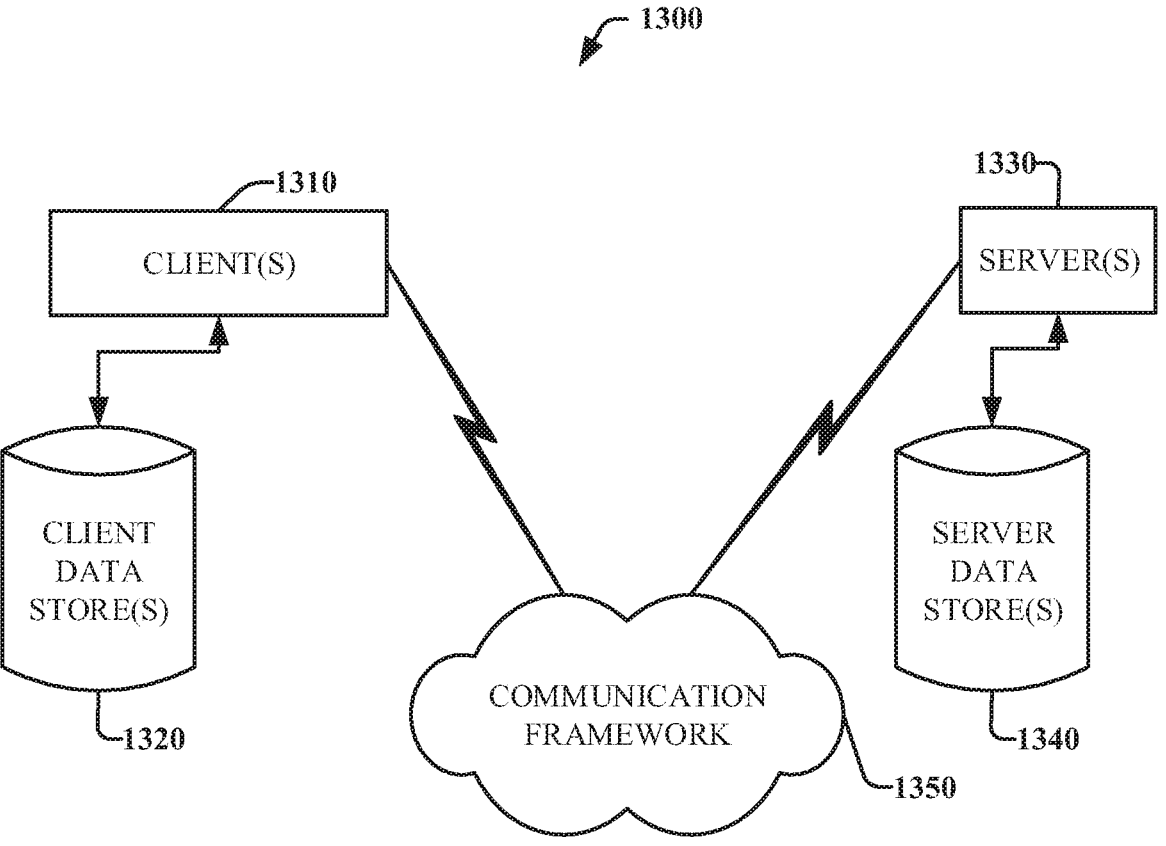
FIG. 13 is a schematic block diagram of an example-computing environment to facilitate storing transaction data in a blockchain in accordance with one or more examples described herein.

In order to provide a context for the various examples of the disclosed subject matter, FIGS. 12 and 13 as well as the following discussion are intended to provide a brief, general description of a suitable environment in which the various examples of the disclosed subject matter may be implemented.

FIG. 12 is a schematic block diagram illustrating a suitable operating environment example to facilitate storing transactions in a blockchain in accordance with one or more examples described herein. With reference to FIG. 12, a suitable environment 1200 for implementing various aspects of this disclosure includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM)

(e.g., ferroelectric RAM (FeRAM). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor-based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a example-computing environment to facilitate storing transactions in a blockchain in accordance with one or more examples described herein. FIG. 13 is a schematic block diagram of a sample-computing environment 1300 with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

The above systems and methods described with respect to FIGS. 1-13 can be employed to facilitate transactions in accordance with a transaction system and in accordance with one or more examples described herein. The respective systems can be implemented on or in connection with a network of servers associated with an enterprise application, for example. In one example, the system can be associated with a cloud-based platform and can also be associated with a computing environment that comprises one or more servers and/or one or more software components that operate to perform one or more processes, one or more functions and/or one or more methodologies in accordance with the described examples. A sever as disclosed herein can include, for example, stand-alone server and/or an enterprise-class server operating a server operating system (OS) such as a MICROSOFT® OS, a UNIX® OS, a LINUX® OS, and/or another suitable server-based OS. It is to be appreciated that one or more operations performed by a server and/or one or more services provided by a server can be combined, distributed, and/or separated for a given implementation. Furthermore, one or more servers can be operated and/or maintained by a corresponding entity or different entities.

The system can be employed by various systems, such as, but not limited to transaction systems, payment systems, online transaction systems, online payment systems, server systems, electronic device systems, mobile device systems, smartphone systems, virtual machine systems, consumer service systems, mobile application systems, financial systems, digital systems, machine learning systems, artificial intelligence systems, neural network systems, network systems, computer network systems, communication systems, enterprise systems, asset management systems, cloud storage systems, social networking systems, point of sale (POS) systems, and the like (note that the terms used above as examples are not mutually exclusive; a "transaction system" does not imply that system cannot also include or be a payment system, server system, and so forth).

In one example, the systems described herein can be associated with a Platform-as-a-Service (PaaS). Moreover, the system and/or the components of the system can be employed to use hardware and/or software to solve problems that are technical in nature (e.g., related to a computing system, related to a server system, related to digital data processing, and so forth), that are not abstract and that cannot be performed as a set of mental acts by a human.

Systems and components can be implemented as stored software instructions that are executable by a processor to cause various operations to occur. Aspects of the systems, apparatuses or processes described herein can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), and so forth, can cause the machine(s) to perform the operations described. The systems can include memory for storing computer executable components and instructions. The systems can further include a processor (or processors) to facilitate operation of the instructions (e.g., computer executable components and instructions).

The transactions described herein can be an electronic exchange executed by an electronic device. Furthermore, the transaction can be associated with one or more events (e.g., one or more transaction events) associated with the electronic device. In an example, an event associated with the transaction can include a numerical value corresponding to an amount for a transaction. Additionally or alternatively, an event associated with the transaction can include time data related to a timestamp for the transaction. An event associated with the transaction can additionally or alternatively include an item associated with the transaction and/or an identifier for one or more entities associated with the transaction. In some examples, the transaction can include a set of transaction requests for an online transaction system. In some examples, the transaction can be a financial transaction. For example, the transaction can be data to facilitate a transfer of funds for transactions between two entities.

In some examples, the transaction can be associated with a web request session. For instance, the web request session can include, for example, establishing a connection with a transaction system (e.g., an online transaction system), sending one or more requests to the transaction system (e.g., an online transaction system) for web session content, and/or receiving web session content from the transaction system (e.g., an online transaction system). In an aspect, the transaction can result in one or more actions, one or more tasks, one or more processes, one or more requests, and/or one or more transmissions being performed via the electronic device and/or an online transaction system in communication with the electronic device.

The electronic device described herein can be a computing device, a user device, a client device, a mobile device, a smart phone, a tablet device, a handheld device, a portable computing device, a smart device (e.g. an Internet-of-Things devices such as a smart television, and so forth), a wearable device, a computer, a desktop computer, a laptop computer, a point of sale (POS) device, and/or another type of electronic device associated with a display (e.g., the electronic device can be more than one of the type of devices listed above, which are non-exclusive categories in various embodiments). In an example, the interfaces described herein can render one or more graphical elements associated with the transactions described herein and presented on a display of the electronic device. This can include management of one or more communications and/or one or more transmissions with respect to the electronic device to facilitate the transaction via the electronic device.

The transaction systems described herein can be an online transaction system in an example and the electronic devices described herein can be in communication via a network. The network can be a communication network, a wireless network, an IP network, a voice over IP network, an internet telephony network, a mobile telecommunications network, a landline telephone network, a personal area network, a wired network, and/or another type of network. The online transaction system can be, for example, a stand-alone server and/or an enterprise-class server operating a server OS such as a MICROSOFT® OS, a UNIX® OS, a LINUX® OS, and/or another suitable server-based OS. It is to be appreciated that one or more operations performed by the online transaction system and/or one or more services provided by the online transaction system can be combined, distributed, and/or separated for a given implementation example. Furthermore, the online transaction system can be associated with a payment system, an online payment system, an enterprise system, and/or another type of system.

Electronic accounts can be managed by the online transaction system. Furthermore, the electronic device can access data regarding the electronic account via the online transaction system, for example. In some examples, the electronic account can facilitate online payments and/or can provide access to funds. In an example, the electronic account can be associated with one or more transactions. For instance, one or more transactions can be executed and/or initiated via the electronic device. The electronic account and/or the electronic device can be associated with a user (e.g., a user identity, a buyer, a seller, and so forth). In an example, a transaction for the electronic account can be executed by the online transaction system. Additionally or alternatively, a payment related to the transaction for the electronic account can be processed by the online transaction system. In another example, data associated with the electronic account can be rendered via a display of the electronic device. For instance, data associated with the electronic account can be rendered as one or more visual elements via a display of the electronic device.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the examples described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A computer-implemented method comprising:
receiving, by a validator component, information respective of a transaction involving a user, the information comprising transaction data respective of the transaction to be added to a blockchain;
in response to receiving the transaction data, generating, by the validator component, a query and transmitting the query to a blockchain responder component, wherein the query solicits, from the blockchain responder component, one or more of:
a portion of the transaction data that is less than an entirety of the transaction data;

a timestamp associated with the transaction; or
a contextual detail of the transaction;
receiving, by the validator component, an answer to the query from the blockchain responder component; and
verifying, by the validator component, that the received answer matches the information respective of the transaction and, in response, causing, by validator component, a data block comprising the transaction data to be added the blockchain.

2. The computer-implemented method of claim 1, wherein the query is a second query, wherein receiving the information respective of the transaction comprises:
generating, by the validator component, a first query respective of the transaction;
transmitting, by the validator component, the first query to the user; and
receiving, by the validator component, a response to the first query from the user;
wherein the information comprises the response.

3. The computer-implemented method of claim 1, wherein:
the query comprises a plurality of queries;
receiving the answer comprises receiving respective answers to each of the plurality of queries; and
the verifying comprises verifying that each of the respective answers matches the information respective of the transaction.

4. The computer-implemented method of claim 1, wherein the blockchain responder component comprises a miner on the blockchain.

5. The computer-implemented method of claim 1, wherein causing the data block to be added the blockchain comprises instructing the blockchain responder component, by the validator component, to add the data block to the blockchain.

6. The computer-implemented method of claim 1, wherein causing the data block to be added the blockchain comprises adding, by the validator component, the data block to the blockchain.

7. The computer-implemented method of claim 1, further comprising:
providing, by the validator component, a public encryption key to the blockchain responder component, the public encryption key paired with a private encryption key held by the first computing system; and
encrypting the query using the private key to generate an encrypted query;
wherein transmitting the query comprises transmitting the encrypted query.

8. The computer-implemented method of claim 1, further comprising:
administering, by the validator component, a Turing test to the user.

9. A computing system comprising:
a processor; and
a non-transitory, computer-readable memory containing instructions that, when executed by the processor, cause the system to perform operations comprising:
receiving, by a blockchain responder component, information respective of a transaction, the information comprising transaction data respective of the transaction, the transaction data to be added to a blockchain;
receiving, by the blockchain responder component, a query from a validator component that solicits one or more of:

a portion of the transaction data that is less than an entirety of the transaction data;

a timestamp associated with the transaction; or a contextual detail of the transaction;

determining, by the blockchain responder component, an answer to the query based on the information and transmitting the answer to the validator component;

receiving, by the blockchain responder component, from the validator component in response to the answer, an instruction to add the transaction data to the blockchain; and in response to the instruction, adding, by the blockchain responder component, the transaction data to the blockchain.

10. The computing system of claim 9, wherein:

receiving the query comprises receiving a plurality of queries;

determining the answer to the query based on the information and transmitting the answer to the validator component comprises determining a respective answer to each of the queries based on the information and transmitting the respective answers to the validator component; and receiving the instruction comprises receiving the instruction in response to the answers.

11. The computing system of claim 9, wherein:

receiving the query from the validator component comprises receiving a plurality of queries from a plurality of respective validator components;

determining the answer to the query based on the information and transmitting the answer to the validator comprises determining a respective answer to each of the queries based on the information and transmitting the respective answers to the validator components; and receiving the instruction comprises receiving the instruction in response to the answers.

12. The computing system of claim 11, wherein transmitting the respective answers to the validator components comprises transmitting all of the answers to all of the validator components.

13. The computing system of claim 11, wherein receiving the instruction comprises receiving a respective instruction to add the transaction data to the blockchain from each of the validator components.

14. The computing system of claim 9, wherein the computing system is a miner on the blockchain.

15. A computer-implemented method comprising:

receiving, by a validator component, information respective of a transaction involving a user, the information comprising transaction data respective of the transaction to be added to a blockchain;

in response to receiving the transaction data, generating, by the validator component, a plurality of queries and transmitting the queries to a blockchain responder component, wherein each query solicits, from the blockchain responder component, a respective one or more of:

a portion of the transaction data that is less than an entirety of the transaction data;

a timestamp associated with the transaction; or a contextual detail of the transaction;

receiving, by the validator component, a respective answer to each query from the blockchain responder component; and verifying, by the validator component, that the received answers match the information respective of the transaction and, in response, causing, by the validator component, a data block comprising the transaction data to be added the blockchain.

16. The computer-implemented method of claim 15, wherein each of the plurality of queries solicits a respective portion of the transaction data that is less than an entirety of the transaction data.

17. The computer-implemented method of claim 15, wherein a first one of the plurality of queries solicits a portion of the transaction data that is less than an entirety of the transaction data and a second one of the plurality of queries solicits a timestamp associated with the transaction or a contextual detail of the transaction.

18. The computer-implemented method of claim 15, wherein causing the data block to be added the blockchain comprises instructing the blockchain responder component, by the validator component, to add the data block to the blockchain.

19. The computer-implemented method of claim 15, wherein causing the data block to be added the blockchain comprises adding, by the validator component, the data block to the blockchain.

20. The computer-implemented method of claim 15, wherein the queries are second queries, wherein receiving the information respective of the transaction comprises:

generating a plurality of first queries respective of the transaction;

transmitting the first queries to the user; and receiving responses to the first queries from the user;

wherein the information comprises the responses; and wherein the second queries are identical to the first queries.

* * * * *